May 22, 1928.　　　　　　　　　　　　　　　　1,670,304
J. W. GREEN
MACHINE FOR USE IN MANUFACTURING WOODEN HEELS FOR SHOES
Filed Feb. 14, 1927　　　6 Sheets-Sheet 1

Fig. 1.

Inventor:
John W. Green,
by Rippey & Kingsland,
His Attorneys.

May 22, 1928.  
J. W. GREEN  
1,670,304  
MACHINE FOR USE IN MANUFACTURING WOODEN HEELS FOR SHOES  
Filed Feb. 14, 1927  6 Sheets-Sheet 4

Fig. 4.

Inventor.  
John W. Green,  
by Rippey & Kingsland  
His Attorneys.

May 22, 1928.

J. W. GREEN

1,670,304

MACHINE FOR USE IN MANUFACTURING WOODEN HEELS FOR SHOES

Filed Feb. 14, 1927  6 Sheets-Sheet 6

Inventor:
John W. Green,
By Rippey & Kingsland.
His Attorneys.

Patented May 22, 1928.

1,670,304

UNITED STATES PATENT OFFICE.

JOHN W. GREEN, OF ST. LOUIS, MISSOURI, ASSIGNOR TO PAWNEE WOOD HEEL CO., OF ST. LOUIS, MISSOURI, A CORPORATION OF MISSOURI.

MACHINE FOR USE IN MANUFACTURING WOODEN HEELS FOR SHOES.

Application filed February 14, 1927. Serial No. 168,046.

This invention relates to machines for use in manufacturing wooden heels for shoes.

An object of the invention is to provide a machine for use in manufacturing wooden heels for shoes by means of which heels of different dimensions and shapes may be formed.

Another object of the invention is to provide a machine for use in the manufacture of wooden heels for shoes whereby the corners at the intersection of the rounded outer wall and the breast wall may be turned or rounded. This result is preferably obtained as disclosed herein by providing means for supporting and operating the heel in different relationships to the cutters so that the corners may be rounded in different degrees, as desired.

Other objects will appear from the following description, reference being made to the drawings, in which.

This machine comprises a strong supporting frame 1 upon which a base plate 2 for the operating mechanism is secured by screws 3. A pair of plates 4 are pivoted to the base 2 by screws 5, extent of movement of the plates 4 about their pivots 5 being limited by screws 6 passing through slots 7 in the plates 4 and being attached to the base 2. The front ends of these plates 4 are connected by a strong retractile spring 8, the tendency of which is to draw toward each other the front ends of said plates. Each of the plates 4 supports a bearing 9 in which a shaft 10 is journaled. To the front end of each of the shafts 10 a cutter 11 of appropriate construction is attached, these cutters being shaped to cut the corners at the intersection of the outer and breast walls of the heels to a shape in which said corners are rounded. These corners are rounded to any desired height from the lower ends of the heels upwardly. The shafts 10 are rotated by a belt 12 operatively engaging pulleys 13 on the shafts.

Figure 5:
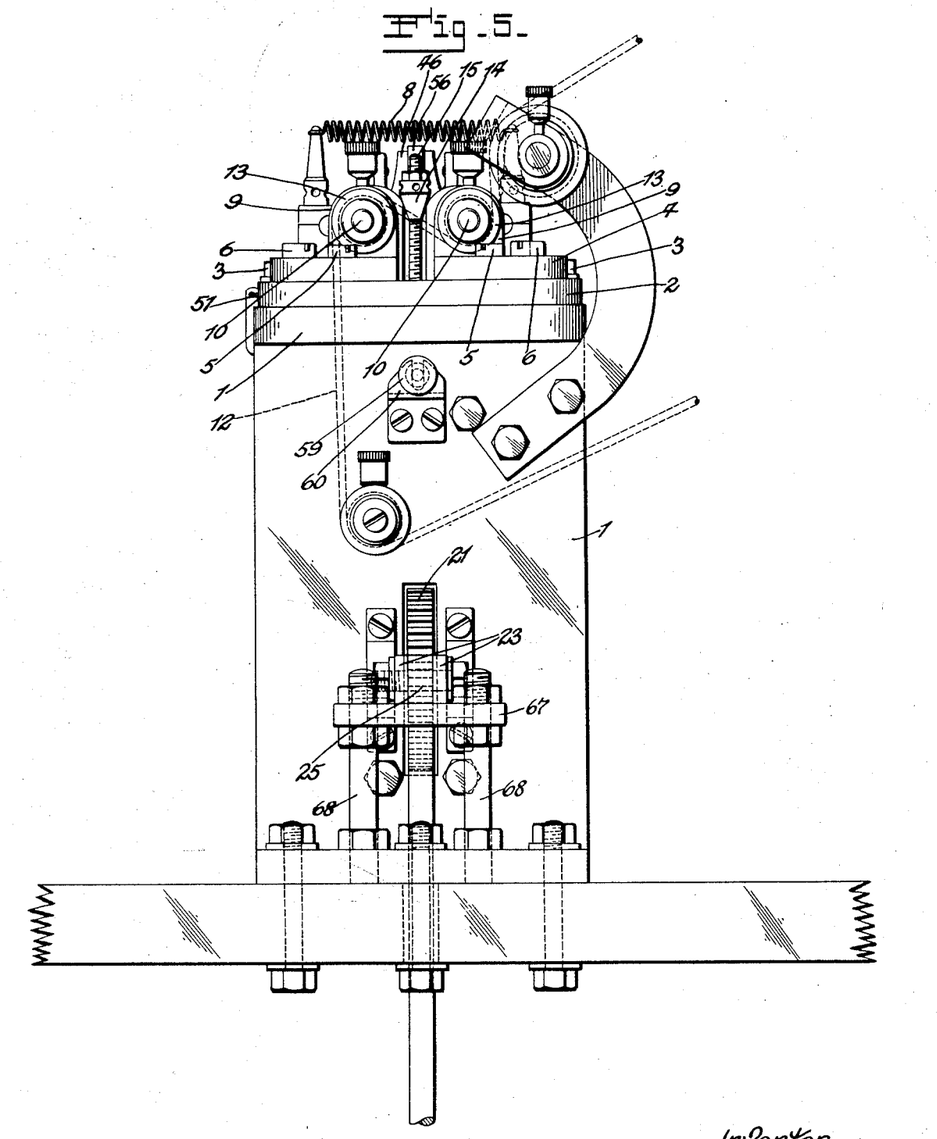
Fig. 5 is a rear elevation.

The cutters 11 may be held in different spaced adjustments by cooperation of the spring 8 with an intervening adjustable abutment. As shown (Fig. 5) a cone nut 14 is screwed on a vertical rod 15 between the bearings 9 and limits movement of the plates 4 toward each other. Obviously by proper adjustment of the cone nut 14 on the rod 15, the space between the front ends of the plates 4 and consequently the space between the cutters 11 can be varied, as desired.

Figure 2:
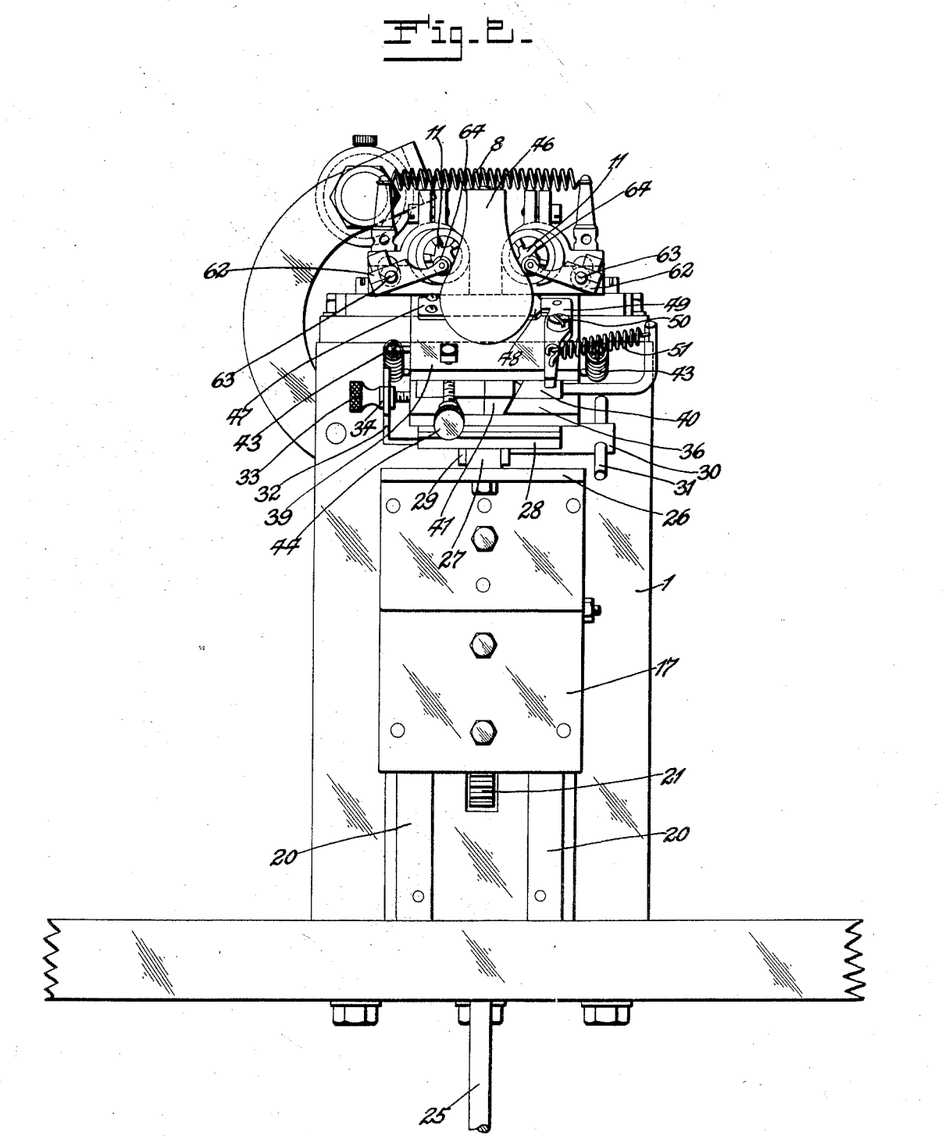
Fig. 2 is a front elevation.
Figure 3:
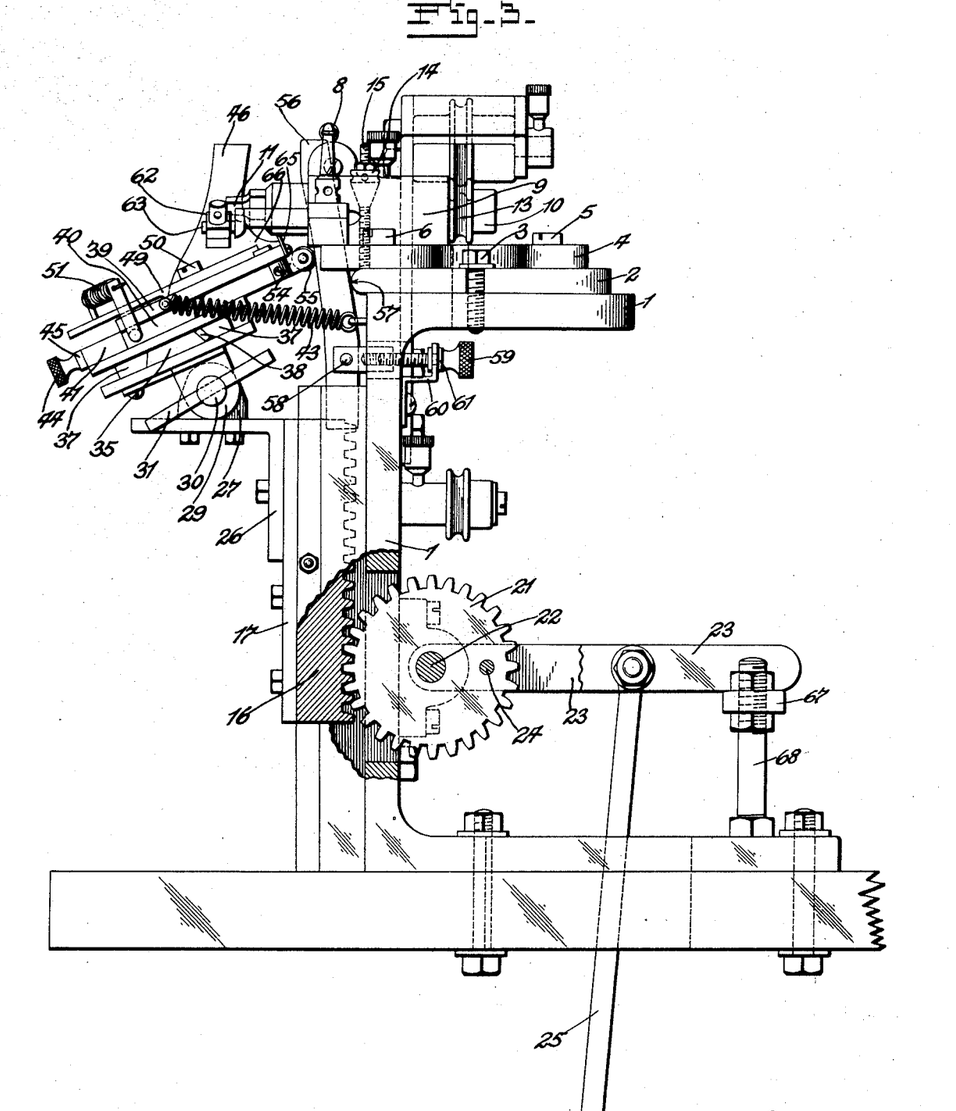
Fig. 3 is a side elevation with parts in section.
Figure 4:
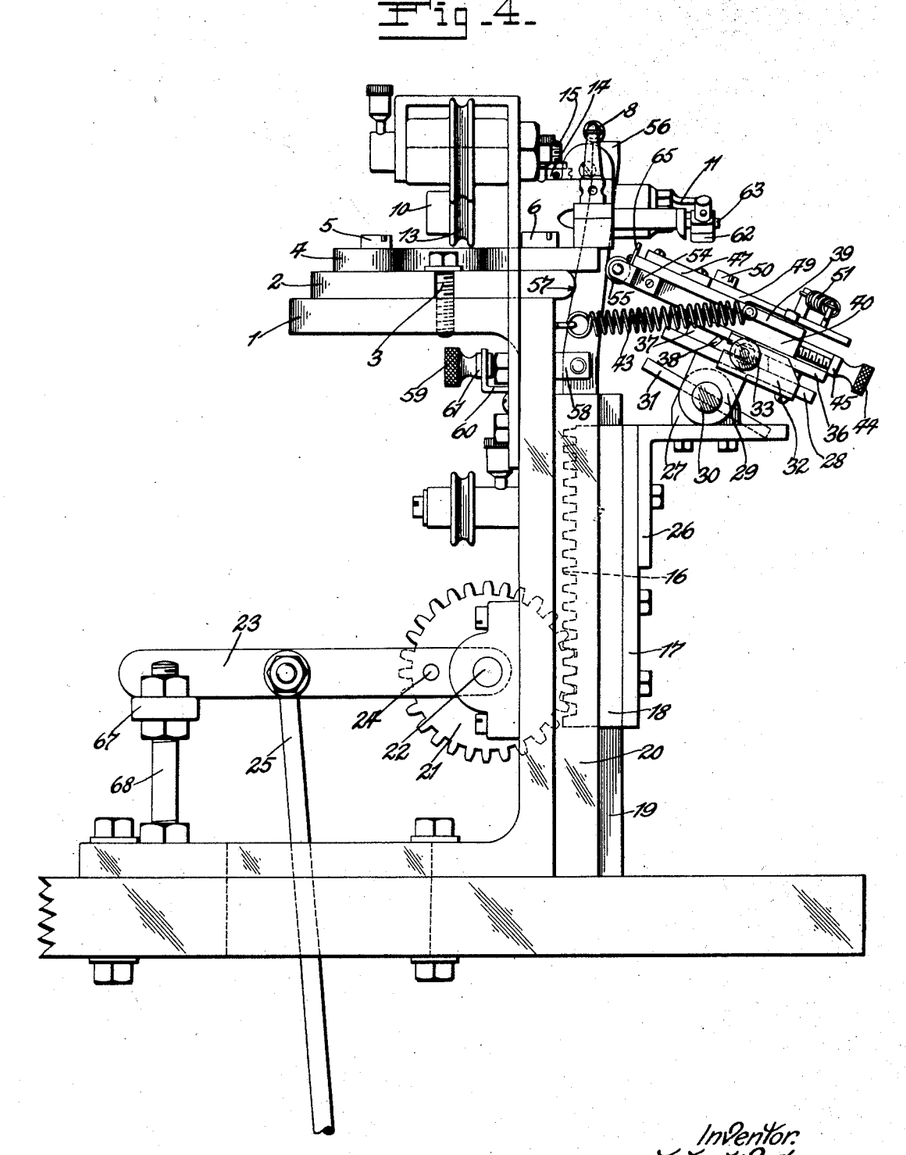
Fig. 4 is a view showing in elevation the opposite side of the machine from that shown in Fig. 3.

The heel supporting and operating mechanism is mounted in connection with the frame 1. A rack 16 is attached to a plate 17 having side pieces 18 in connection therewith and engaging in grooves 19 in guide elements 20 attached to the frame 1 (Figs. 2 and 4). The rack 16 is in constant mesh with a gear wheel 21 (Fig. 3) mounted on a gear shaft 22 supported by the frame 1. A pair of arms 23 have their forward ends supported on the shaft 22 at opposite sides of the wheel 21. A pin 24 extends through the arms 23 and through the gear wheel 21 near the periphery of said wheel, so that vertical oscillation of the arms 23 will rock the gear wheel 21 and raise and lower the rack 16 and the mechanism supported thereby. A connection 25 is provided for imparting these vertical oscillating movements to the arms 23, which connection may be operated in any known or preferred manner.

A bracket 26 is attached to the upper end of the plate 17. A block 27 is supported rigidly by the bracket 26 and by this block the heel supporting and operating mechanism is supported and which I will now proceed to describe.

A plate or table 28 has a pair of rigid depending ears 29 embracing the block 27 between them and preferably having close frictional engagement with said block 27. A pivot 30 passing through the ears 29 and the block 27 pivotally supports the plate 28. This pivot 30 has rigid connection with the ears 29 so that, when the pivot is turned, the plate 28 is moved accordingly. The engagement of the pivot 30 with the block 27 is relatively tight, so that the parts will not turn accidentally. A handle 31 affords means for manually turning the pivot 30. A bracket 32 is attached to the plate 28 and supports a screw 33. This screw is rotative in the bracket 32 and is held from endwise movement by collars 34. Said screw 33 is screwed into a threaded hole, a dove-tailed portion 35 of a laterally adjustable plate 36 engaging under guides 37 rigid with the plate 28. A wearing strip 38 (Fig. 3) may be interposed between one edge of the dove-tail 35 and the adjacent guide 37.

Figure 1:
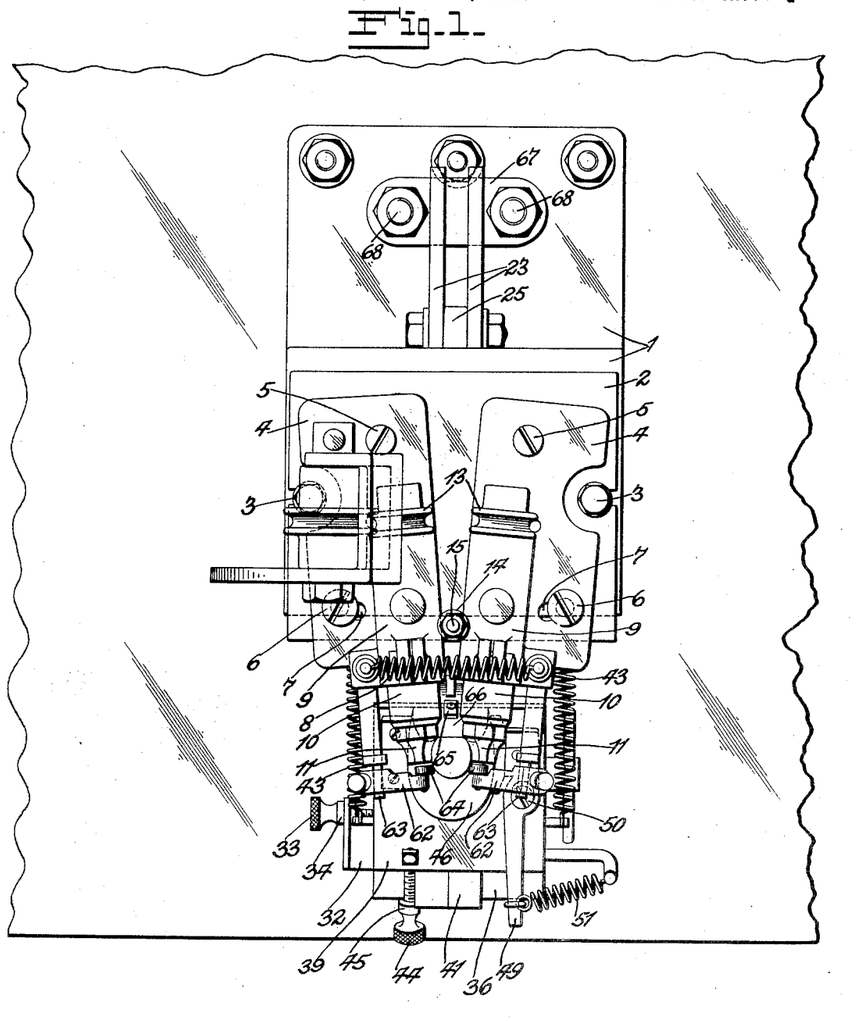
Fig. 1 is a plan view of my improved machine.

A plate 39 (Fig. 7) has beveled pieces 40 in rigid connection with the underside thereof engaging under a dove-tailed piece 41 that is rigid with the plate 36. A wearing strip 42 may be interposed between one edge of the dove-tailed guide 41 and the adjacent part 40. A pair of springs 43 connecting the plate 39 with the frame 1 (Figs. 1, 4 and 5) actuate the plate 39 rearwardly. A screw 44 is screwed into one of the parts 40 and has a shoulder 45 bearing against the end of the guide 41 and is operative to draw and hold the plate 39 forwardly in opposition to the power of the springs 43.

Figure 6:
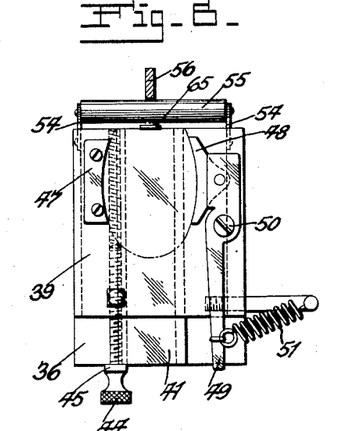
Fig. 6 is a plan view of the heel supporting device.
Figures 10, 11:
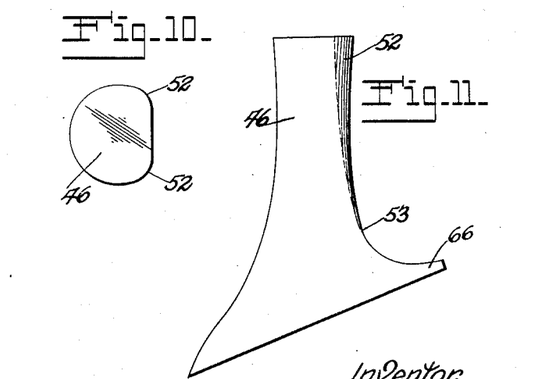
Fig. 10 is a lower end elevation of the same heel after operation of the machine thereon.
Fig. 11 is an inverted side elevation of the finished heel.

A wooden heel 46 is shown mounted upon the plate 39 in position for operation of the machine to bevel or round off the corners of the heel at the intersection of the outer and breast walls. The heel is placed upon the plate 39 in inverted position in which the top end of the heel seats upon the plate 39. One side edge of the flaring upper end of the heel seated on the plate 39 is engaged under the beveled inner edge of a clamping part 47 (Figs. 2, 6 and 7) that is rigidly secured to the plate 39. The opposite beveled side edge of the shoe heel is engaged by a clamping shoe 48 pivoted to a lever 49. This lever 49 is mounted on a pivot 50 in connection with the plate 39 and is actuated by a spring 51 in a direction to hold the clamping shoe 48 in clamping engagement with the shoe heel. These clamping elements 47 and 48 are designed and intended to support the shoe heel in position for movement between the cutters 11 so that said cutters will turn or round off the corners of the shoe heel at the intersection of the outer and breast walls of the heel to the approximate form shown in Figs. 10 and 11. These rounded portions are tapered; that is, the arcs of the rounded corners are of greatest length at the lower ends of the heels and are of gradually reduced arcuate length toward the top. This will be understood by reference to Fig. 11, wherein it will be seen that the rounded corners 52 terminate about the point 53 and that the circumferential length of the rounded corners gradually decreases from the lower end of the heel to the point 53. As shown, (Fig. 3), the heel is supported for vertical movement between the cutters 11 in a position in which the breast wall of the heel is slightly inclined toward the cutters so that, when the heel supporting mechanism is moved up or down between the cutters, the heel corners are rounded as shown in Fig. 11.

Figure 8:
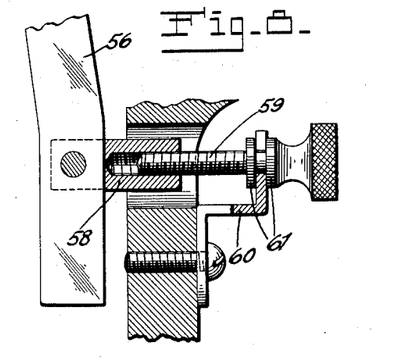
Fig. 8 is a view showing the device for controlling the relationship of the heel support to the cutters during operation of the machine.
Figure 9:
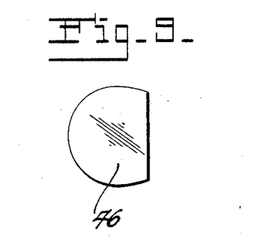
Fig. 9 is a lower end elevation of a wooden heel before being operated upon by the machine.

The parts 40 which are rigid with the plate 39 have rearwardly extending arms 54 supporting a roller 55 which operates against the front edge of an adjustable track or abutment 56. This track or abutment 56 pivotally bears against the front edge of the base plate 2 as shown at 57 (Figs. 3 and 4). An internally threaded sleeve 58 (Fig. 8) is pivoted to the abutment 56. A screw 59 is rotatively supported by a bracket 60 and held from endwise movement by collars 61. This screw 59 is screwed into the sleeve 58 and thereby supports the track or abutment 56. The front edge of the track or abutment 56 inclines upwardly and forwardly. Since the plate 39 is actuated rearwardly by the springs 43, it will be understood by reference to Figs. 3 and 4 that, as the heel supporting mechanism is moved downwardly, the plate 39 with the heel thereon is moved rearwardly to a slight extent, due to the fact that the front edge of the abutment or track 56 recedes downwardly, permitting the springs 43 to move the plate 39 rearwardly, until the shoulder 45 of the screw 44 stops such rearward movement.

A pair of arms 62 are mounted on rods 63. Each of said arms has a roller 64 on its inner end. The heel engaged by the clamping elements 47 and 48 extends between the rollers 64 so that said rollers operate against the sides of the heel as the heel supporting mechanism is raised and lowered. This is because the rods 63 are supported by the plates 4 instead of by the heel supporting mechanism. When the nut 14 is adjusted to control the spacing of the cutters 11 properly, as determined by the size and shape of heels constituting the work to be operated upon, the rollers 64 will, in all such cases, operate against the sides of the heels, thus cooperating with the nut 14 to control the spacing of the cutters 11 in order to attain the rounded corners 52. These rollers 64 also cooperate with the heel clamping elements 47 and 48 to hold the heels in proper adjustment for operation of the cutters. In order to facilitate proper positioning and centering of the heels, there is an abutment 65 for the edge 66 of the heel. This abutment 65 is rigid with the plate 39 as is the heel gripper 47, so that there is no difficulty in properly adjusting the heels irrespective of their sizes.

At the beginning of each operation of the machine, the rack 16 and the heel supporting structure mounted thereon is in lower position, so that, when the heel is placed upon the plate 39 between the grippers 47 and 48 and against the abutment 65, the inverted lower end of the heel is below the cutters 11. Thereupon, the operating connection 25 is operated to draw down the rear ends of the arms 23 to the positions in which they are shown (Figs. 3 and 4), causing the gear wheel 21 to raise the rack 16 and thereby the heel supporting mechanism. As the heel supporting mechanism is raised, the corners at the intersection of the outer and breast walls of the heel are engaged by the cutters, producing the rounded corners 52 which terminate at the point 53 (Fig. 11). These diminishing rounded corners are produced as a result of the operation of the roller 55 against the inclined edge of the abutment track 56 which pushes forwardly the plate 39 on which the heel is mounted. Being engaged between the grippers 47 and 48 and guided by the rollers 64, the heel is held properly to obtain the desired rounded corners. Extent of upward movement of the heel by the operating mechanism is limited by an abutment 67 for the arms 23 which stops downward movement of said arms at the proper point. This abutment 67 is mounted on supports 68 and may be adjusted thereon to vary extent of movement of the arms 23 as required to limit extent of movement of the heels between the cutters 11, which variation in operation is desirable to accommodate the machine to work upon heels of different shapes and sizes.

Figure 7:
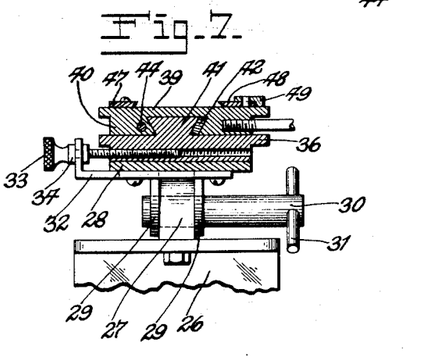
Fig. 7 is a transverse sectional view of the heel supporting device.

In case it is desired to work upon heels having breast walls of different widths, the heel supporting mechanism may be adjusted laterally relative to the cutters by operation of the screw 33, as will be understood by reference to Fig. 7. By turning the screw in one direction, the heel supporting plate 39 will be moved toward the left, as required to receive and properly support heels having relatively wide breast walls and, by turning the screw in the opposite direction, the heel supporting plate will be moved toward the right to accommodate heels having relatively narrow breast walls.

By operating the screw 44, the plate 39 may be adjusted rearwardly or forwardly, as desired, in order to support the heels in such relationship to the cutters 11 for the desired results. Where it is desired to produce long rounded arcs or corners, the screw 44 is adjusted to move the supporting plate 39 rearwardly. This also requires an adjustment of the abutment track 56 to permit such rearward adjustment of the plate 39.

To move the upper end of the abutment track 56 rearwardly for this purpose, the screw 59 is adjusted to support the lower end of said abutment track 56 forwardly, permitting the abutment track to pivot about 57 (Fig. 3). For, when the lower end of the abutment track 56 is supported forwardly, the strong springs 43 cause the roller 55 to push the upper end of the abutment track rearwardly. In this way, by adjustment of the screw 44 for the plate 39 and the screw 59 for the abutment track 56, the heels will be supported and operated as desired, so that the cutters 11 will round the corners of the heels to the extent desired.

The operation of this machine is rapid and economical. The construction and arrangement of most of the elements of the machine may be varied without departure from the nature and principle of the invention. I do not restrict myself unessentially, but what I claim and desire to secure by Letters Patent is:—

1. A machine of the character described comprising a pair of spaced cutters, means for operating said cutters, a support, devices for clamping a wooden heel approximately perpendicularly on said support, and mechanism for operating said support to move the wooden heel between and into simultaneous engagement with said cutters.

2. A machine of the character described comprising a pair of spaced rotary cutters, means for holding said cutters in different spaced adjustments for beginning operation on heels of different dimensions, means for rotating said cutters in any of said adjustments, a support, means for securing a wooden heel in connection with said support, and mechanism for operating said support to move the wooden heel between and into simultaneous engagement with said cutters.

3. A machine of the character described comprising a pair of spaced rotary cutters, means for holding said cutters in different spaced adjustments, means for rotating said cutters in any of said adjustments, a support, means for securing a wooden heel in connection with said support, mechanism for operating said support to move the wooden heel between said cutters, and means for moving said support in a direction away from said cutters as an incident to the aforesaid operation.

4. A machine of the character described comprising a cutting mechanism, devices for holding said cutting mechanism in different adjustments for beginning operation on heels of different dimensions, means for operating said cutting mechanism, a support for wooden shoe heels, means for adjusting said support in different lateral and forward adjustments with respect to said cutting mechanism, and means for operating said support to move wooden heels into engagement with said cutting mechanism.

5. A machine of the character described comprising cutting mechanism, means for operating said cutting mechanism, a support for wooden shoe heels, means for securing said support for operation in different lateral and forward adjustments with respect to said cutting mechanism for supporting heels of different dimensions, means for operating said support to move wooden heels into engagement with said cutting mechanism, and means for varying the extent of said operations.

6. A machine of the character described comprising a pair of spaced cutters, a support for wooden shoe heels, means for holding heels upon said support in position in which the corners at the intersection of the breast and outer walls of the heels are toward said cutters respectively, and means for operating said support to move said corners of the wooden heels into engagement with said cutters respectively.

7. A machine of the character described comprising cutting mechanism, a support for wooden shoe heels, means for holding heels upon said support in position in which the corners at the intersection of the breast and outer walls of the heels are toward said cutting mechanism, and means for operating said support to move the wooden heels into engagement with said cutting mechanism in a relationship in which said corners at the intersection of the breast and outer walls of the heels are cut to rounded form by said cutting mechanism.

8. A machine of the character described comprising a pair of spaced rotary cutters, a support, means for clamping a wooden shoe heel upon said support, mechanism for moving said support in a direction to move the heel between said cutters, and means for actuating said support in a direction away from said cutters when said support is moved as aforesaid.

9. A machine of the character described comprising a pair of rotary cutters, mechanism for supporting and moving wooden shoe heels between said cutters, and means operating against said heels to move the cutters apart as an incident to the movement of the heels between the cutters.

10. A machine of the character described comprising a pair of cutters pivoted for movement toward and away from each other, mechanism for moving tapered wooden heels between said cutters, and devices operative against the heels for moving said cutters apart as the increasing width of heels moves between said cutters.

11. A machine of the character described comprising a pair of cutters pivoted for movement toward and away from each other, mechanism for moving tapered wooden heels between said cutters, devices for moving said cutters apart as the increasing width of heels moves between said cutters, and a spring for actuating said cutters toward each other.

12. A machine for rounding the corners of tapered wooden heels comprising a pair of rotary cutters pivoted for movement toward and away from each other, mechanism for operating said cutters during such movement of said cutters toward and away from each other, mechanism for moving a tapered wooden shoe heel between said cutters, and means cooperating with the heel to move the cutters apart as the increasing width of the heel moves between the cutters.

13. A machine for rounding the corners of tapered wooden heels comprising a pair of rotary cutters pivoted for movement toward and away from each other, mechanism for operating said cutters during such movement of said cutters toward and away from each other, mechanism for moving a tapered wooden shoe heel between said cutters, means cooperating with the heel to move the cutters apart as the increasing width of the heel moves between the cutters, and means for gradually moving the heel from between the cutters as the increasing width of the heel passes between the cutters.

14. A machine for cutting to round form corners at the intersection of the outer and breast walls of wooden heels comprising a pair of spaced cutters, a support for wooden heels, means for holding heels on said support, mechanism for operating said support to move the wooden heels between said cutters, and mechanism operative against the heels for gradually moving the cutters apart as the wooden heel is placed between the cutters as aforesaid.

15. A machine for cutting to round form corners at the intersection of the outer and breast walls of wooden heels comprising a pair of spaced cutters, a support for wooden heels, means for holding heels on said support, mechanism for operating said support to move the wooden heels between said cutters, mechanism controlled by the heels for gradually moving the cutters apart as the wooden heel is placed between the cutters as aforesaid, and means for gradually moving said support in a direction to move the wooden heels gradually from between the cutters during the movement aforesaid.

16. A machine for cutting to round form corners at the intersection of the outer and breast walls of wooden heels comprising a pair of spaced cutters, a support for wooden heels, means for holding heels on said support, mechanism for operating said support to move the wooden heels between said cutters, mechanism for gradually moving the cutters apart as the wooden heel is placed between the cutters as aforesaid, means for gradually moving said support in a direction to move the wooden heels gradually from between the cutters during the movement aforesaid, and devices for restoring all of said parts to their initial positions as an incident to the withdrawal of the heels from between said cutters.

17. A machine of the character described comprising a pair of spaced rotary cutters, means for rotating said cutters, a support for a wooden heel, devices for clamping a wooden heel on said support, means operative against the heels to move the cutters apart, and mechanism for moving said support in a direction to move said heel longitudinally between said cutters.

18. A machine of the character described comprising a pair of spaced rotary cutters, means for rotating said cutters, a support for a wooden heel, devices for clamping a wooden heel on said support, and mechanism for moving said support in a direction to move said heel longitudinally between said cutters with the corners at the intersection of the breast and outer walls of the heel toward the cutters respectively.

19. A machine of the character described comprising a pair of spaced rotary cutters, means for rotating said cutters, a support for a wooden heel, devices for clamping a wooden heel on said support, mechanism for moving said support in a direction to move said heel longitudinally between said cutters, and mechanism for gradually moving the heel from between the cutters during the movement aforesaid.

20. A machine of the character described comprising a pair of spaced rotary cutters, means for rotating said cutters, a support for a wooden heel, devices for clamping a wooden heel on said support, mechanism for moving said support in a direction to move said heel longitudinally between said cutters with the corners at the intersection of the breast and outer walls of the heel toward the cutters respectively, and mechanism for gradually moving the heel from between the cutters during the movement aforesaid.

21. A machine of the character described comprising a pair of spaced cutters, means for rotating said cutters, and mechanism for supporting and moving a wooden heel between said cutters and gradually away from said cutters and causing said cutters to form rounded corners at the intersection of the breast and outer walls of the heel.

22. A machine of the character described comprising a pair of spaced cutters, means for rotating said cutters, and mechanism for supporting and moving a wooden heel between said cutters and gradually away from said cutters and causing said cutters to form tapered rounded corners at the intersection of the breast and outer walls of the heel.

23. A machine of the character described comprising a pair of spaced rotary cutters, a support for a wooden heel, means for clamping the upper ends of heels of different sizes on said support and leaving the lower ends free for movement between said cutters, and mechanism for adjusting said support relative to said cutters in positions in which heels of varying sizes are supported in centered relationship to said cutters for movement between said cutters.

24. A machine of the character described comprising a pair of spaced rotary cutters, a support for a wooden heel, means for clamping the upper ends of heels of different sizes on said support and leaving the lower ends free for movement between said cutters, mechanism for adjusting said support relative to said cutters in positions in which heels of varying sizes are supported in centered relationship to said cutters for movement between said cutters, and mechanism for operating said support to move said heel between said cutters.

25. A machine of the character described comprising a pair of spaced rotary cutters, a support for a wooden heel, means for clamping the upper ends of heels of different sizes on said support for movement between said cutters, mechanism for adjusting said support relative to said cutters in positions in which heels of varying sizes are supported in centered relationship to said cutters for movement between said cutters, and mechanism for operating said support to move said heel simultaneously between said cutters and gradually away from said cutters.

26. In a machine of the character described, cutting mechanism, a support, an element mounted on said support for adjustment toward and away from said cutters, a plate mounted on said element for adjustment laterally relative to said cutters, devices for adjusting said element and said plate respectively as aforesaid, clamping means for holding a wooden heel on said plate in position in which the corners at the intersection of the breast and outer walls of the heel are toward said cutters respectively, and mechanism for operating said support to move the heel between the cutters.

27. In a machine of the character described, cutting mechanism, a support, an element mounted on said support for adjustment toward and away from said cutters, a plate mounted on said element for adjustment laterally relative to said cutters, devices for adjusting said element and said plate respectively as aforesaid, clamping means for holding a wooden heel on said plate in position in which the corners at the intersection of the breast and outer walls of the heel are toward said cutters respectively, mechanism for operating said support to move the heel between the cutters, and mechanism cooperating with the heel gradually spreading the cutters apart as the heel is moved between the cutters as aforesaid.

28. In a machine of the character described, cutting mechanism, a support, an element mounted on said support for adjustment toward and away from said cutters, a plate mounted on said element for adjustment laterally relative to said cutters, devices for adjusting said element and said plate respectively as aforesaid, clamping means for holding a wooden heel on said plate in position in which the corners at the intersection of the breast and outer walls of the heel are toward said cutters respectively, mechanism for operating said support to move the heel between the cutters, mechanism cooperating with the heel gradually spreading the cutters apart as the heel is moved between the cutters as aforesaid, and a device for drawing the cutters toward each other after the heel is withdrawn from between them.

29. A machine of the character described comprising a pair of spaced cutters for cutting the corners of wooden heels, mechanism for supporting wooden heels of different sizes in centered relationship to said cutters for operation of said cutters on the corners of heels, and means for operating said mechanism to move the heel supported thereby between the cutters and gradually withdrawing the heel from between the cutters and causing said cutters to cut tapered rounded corners on the heel.

30. A machine of the character described comprising a pair of spaced cutters, mechanism for supporting and moving a wooden heel between said cutters and causing said cutters to cut rounded corners at the intersection of the breast and outer walls of the heel, and means for gradually withdrawing the heel from between the cutters during the operation aforesaid.

31. A machine of the character described comprising a pair of spaced cutters, mechanism for supporting and moving a wooden heel between said cutters and causing said cutters to cut rounded corners at the intersection of the breast and outer walls of the heel, and means for gradually withdrawing the heel from between the cutters during the operation aforesaid and simultaneously spreading the cutters apart.

32. A machine of the character described comprising a pair of spaced cutters, mechanism for supporting and moving a wooden heel between said cutters and causing said cutters to cut rounded corners at the intersection of the breast and outer walls of the heel, means for gradually withdrawing the heel from between the cutters during the operation aforesaid and simultaneously spreading the cutters apart, and a device for drawing the cutters toward each other after the heel is withdrawn.

33. A machine of the character described comprising a pair of spaced cutters, mechanism for rotating said cutters, a device actuating said cutters toward each other, means for moving a wooden heel between said cutters and causing the cutters to cut rounded corners on the heel, and means operating against the heel for gradually spreading the cutters apart during movement of the heel between the cutters.

34. A machine of the character described comprising a pair of spaced cutters, mechanism for rotating said cutters, a device actuating said cutters toward each other, means for moving a wooden heel between said cutters and causing the cutters to cut rounded corners on the heel, means operating against the heel for gradually spreading the cutters apart during movement of the heel between the cutters, and means for gradually withdrawing the heel from between the cutters.

JOHN W. GREEN.